United States Patent
Weih

(10) Patent No.: US 11,982,386 B2
(45) Date of Patent: May 14, 2024

(54) PROCESS FOR PRODUCING GRIPPING ELEMENTS FOR SEALING AND RESTRAINT SYSTEMS FOR FLUID PIPELINES AND PIPE JOINTS PRODUCED THEREBY

(71) Applicant: S & B Technical Products, Inc., Fort Worth, TX (US)

(72) Inventor: Mark A. Weih, San Jose (CR)

(73) Assignee: S & B Technical Products, Inc., Fort Worth, TX (US)

( * ) Notice: Subject to any disclaimer, the term of this patent is extended or adjusted under 35 U.S.C. 154(b) by 350 days.

(21) Appl. No.: 17/303,158

(22) Filed: May 21, 2021

(65) Prior Publication Data

US 2022/0373117 A1    Nov. 24, 2022

(51) Int. Cl.
| | | |
|---|---|---|
| *F16L 37/091* | (2006.01) | |
| *B22F 3/16* | (2006.01) | |
| *B22F 3/20* | (2006.01) | |
| *B22F 3/22* | (2006.01) | |
| *B22F 3/24* | (2006.01) | |
| *B22F 5/08* | (2006.01) | |
| *B23P 15/00* | (2006.01) | |
| *B33Y 80/00* | (2015.01) | |

(52) U.S. Cl.
CPC .............. *F16L 37/091* (2013.01); *B22F 3/16* (2013.01); *B22F 3/20* (2013.01); *B22F 3/225* (2013.01); *B22F 3/24* (2013.01); *B22F 5/08* (2013.01); *B23P 15/00* (2013.01); *B33Y 80/00* (2014.12); *B22F 2003/247* (2013.01); *B22F 2301/35* (2013.01); *Y10T 29/49428* (2015.01)

(58) Field of Classification Search
CPC ...... B22F 3/16; B22F 3/20; B22F 3/24; B22F 3/225; B22F 3/1021; B22F 5/08; B22F 7/08; B22F 10/10; B22F 2003/247; B22F 2301/035; B22F 2999/00; F16L 37/091; B23P 15/00; B33Y 80/00; B33Y 40/20
See application file for complete search history.

(56) References Cited

U.S. PATENT DOCUMENTS

| | | |
|---|---|---|
| 4,120,521 A | 10/1978 | Parmann |
| 6,376,585 B1 | 4/2002 | Schofalvi et al. |
| 7,284,310 B2 | 10/2007 | Jones et al. |
| 7,491,356 B2 | 2/2009 | Heikkila |
| 9,512,544 B2 | 12/2016 | Heikkila |

(Continued)

OTHER PUBLICATIONS

PCT Application No. PCT/US2022/028329 International Search Report and Written Opinion, 9 pages, mailed May 9, 2022.

*Primary Examiner* — Moshe Wilensky
(74) *Attorney, Agent, or Firm* — Whitaker Chalk Swindle & Schwartz, PLLC; Charles D. Gunter, Jr.

(57) ABSTRACT

A method is shown for manufacturing a hardened gripping element for a sealing and restraint system used for forming a pipe joint in a fluid pipeline. Instead of machining the gripping elements used in the system from a metal stock, a special series of metal injection molding steps are utilized. A metal polymer composite mix is first formed having a metal particulate phase and a polymer phase. A green metal composite article is formed by either extruding the composite mix or molding the composite mix into a metal polymer composite article having at least one gripping surface having a plurality of gripping teeth. The composite article is subjected to thermal debinding and sintering to produce a finished or near finished hardened gripping element.

15 Claims, 6 Drawing Sheets

(56) References Cited

U.S. PATENT DOCUMENTS

| | | |
|---|---|---|
| 10,328,491 B2 | 6/2019 | Heikkila |
| 2013/0113208 A1 | 5/2013 | Liao et al. |
| 2019/0145565 A1 | 5/2019 | Furcoiu |
| 2019/0331274 A1 | 10/2019 | Quesada |
| 2020/0025165 A1 | 1/2020 | Casellas et al. |
| 2020/0147846 A1 | 5/2020 | Vohlidal et al. |

PROCESS FOR PRODUCING GRIPPING ELEMENTS FOR SEALING AND RESTRAINT SYSTEMS FOR FLUID PIPELINES AND PIPE JOINTS PRODUCED THEREBY

BACKGROUND OF THE INVENTION

1. Field of the Invention

The present invention relates generally to the field of pipe joints used to seal fluid pipelines and in particular, to method for producing grip rings and grip inserts for sealing and restraint systems used in such pipe joints, such as those used in the water and sewer industries.

2. Description of the Prior Art

Pipes are commonly used for the conveyance of fluids under pressure, as in city water lines. They may also be used as free-flowing conduits running partly full, as in drains and sewers. Pipes for conveying water in appreciable quantities have been made of steel, cast iron, concrete, vitrified clay, and most recently, plastic including the various polyolefins and PVC.

It is well known in the art to extrude plastic pipes in an elongated cylindrical configuration of a desired diameter and to then cut the extruded product into individual lengths of convenient size suitable for handling, shipping and installing. Each length of pipe is enlarged or "belled" at one end sufficiently to join the next adjacent pipe section by receiving in the female, belled end the unenlarged or "spigot" male end of the next adjacent length of pipe. The inside diameter of the bell is formed sufficiently large to receive the spigot end of the next section of pipe with sufficient clearance to allow the application of packing, caulking, elastomeric gaskets or other sealing devices designed to prevent leakage at pipe joints when a plurality of pipe lengths are joined to form a pipeline.

In the early 1970's, a new technology was developed by Rieber & Son of Bergen, Norway, referred to in the industry as the "Rieber Joint." The Rieber system provided an integral sealing mechanism within the belled or female pipe end for sealing with the spigot end of a mating pipe formed from thermoplastic material. In the Rieber process, the elastomeric gasket was inserted within an internal groove in the socket end of the female pipe as the female or belled end was simultaneously being formed. The provision of a prestressed and anchored elastomeric gasket during the belling process at the pipe factory provided an improved socket end for a pipe joint with a sealing gasket which would not twist or flip or otherwise allow impurities to enter the sealing zones of the joint, thus increasing the reliability of the joint and decreasing the risk of leaks or possible failure due to abrasion. The Rieber process is described in the following issued United States patents, among others: U.S. Pat. Nos. 4,120,521; 4,061,459; 4,030,872; 3,965,715; 3,929,958; 3,887,992; 3,884,612; and 3,776,682. While the Rieber process provided an improved sealing system for plastic pipelines of the type under consideration, it did not include any integral restraint type mechanism.

In addition to the sealing mechanism, there is also a need in many circumstances for a restraint mechanism of some type in fluid pipe joints. In the case of municipal installations, the joints between pipes and between pipes and fittings are often restrained to accommodate varying pressures as well as environmental influences. For example, there are various types of connection mechanisms which are commercially available and which are used in, for example, the waterworks industry. In one type of connection, used for many years, the restraint mechanism was an external clamping device which is totally separated from the sealing function. Thus, a separate mechanism must perform the sealing function. However, it was necessary that an external structure be used to compress the gasket by mechanical action such as T-bolts. These type of joint restraint systems were cumbersome to install and represented a substantial additional effort for the contractor.

Because of these disadvantages, the newer generation of sealing and restraint systems utilize self-restraining joint devices that are internal to the piping system and allow for better corrosion protection of the metal components, as well as better and less time consuming installation procedures. One example is the system known in the industry as the Bulldog® system and is described in U.S. Pat. No. 7,284,310, issued Oct. 23, 2007, to Jones et al., and in other related patents. In this system, the restraining and sealing mechanism includes a circumferential housing and a companion sealing ring which are received within a mating groove provided in the belled end of a female pipe. The circumferential housing has an interior region which contains a gripping ring insert. The sealing ring and housing are integrally located within a belled pipe end during belling operations. The ring-shaped gripping insert is made of metal.

There are a variety of other sealing and restraint systems present in the marketplace and currently under development. In some cases, rather than utilizing a circumferential, ring-shaped gripping insert, the gripping mechanism utilizes more discrete "segments" sometimes formed in the rubber of the sealing gasket, the segments having serrations or steel teeth-like structures. With either the gripping ring or gripping segments, the steel-teeth structures allow only for an entry movement of the male spigot pipe end into the female belled pipe end in making up a pipe joint. Any opposite movement of the spigot causes the teeth to sink into the exterior surface of the pipe, creating a sealing pressure which can withstand and counterbalance commonly encountered thrust forces in field use, thus holding the pipe joint in place and preventing separation. However, in all cases, the gripping inserts need to be sharp and durable, typically of relatively high density, be corrosion resistant and have a high tensile strength. In the past, the production of such items has been reserved for high quality metal materials, such as stainless steel. Also, these structures need to have very accurate part dimensions.

To be produced in the most economical fashion, these internal joint restraints need to be produced in as few steps as possible, as where curing of the polymer takes place in a mold with the inserts already in position. A multi-step process would heighten the production costs significantly. Also, the serrated inserts used in some of the gripping mechanisms at the present time are rarely produced by the same company that produces the fittings as a whole, which makes it mandatory to purchase them from a second manufacturer at high costs. These latter characteristics make the process of production of such gripping mechanisms both expensive and complicated.

Accordingly, there is a need for a cost-effective, simple to manufacture and simple to use combination seal and restraint system for restraining and sealing plastic pipe against internal and external forces at a pipe or fitting connection and for joining and sealing at least two plastic pipes at a pipe joint to form a secure fluid pipeline.

A need also exists for such a seal and restraint system which incorporates gripping elements made using an improved manufacturing process which is simpler and less expensive than currently available techniques.

SUMMARY OF THE INVENTION

The present invention relates to the fabrication of high quality, durable, flexible and strong joint structures, with different types of gripping inserts. For example, the inserts might be heavy, dense hard grip rings or dense, hard, serrated joint inserts for pipeline joints used in the waterworks industry, or other ancillary industrial applications such as in the oil and gas industries where fluid pipelines are used. The gripping inserts of the invention are produced with a much higher weight, at much lower production costs and energy consumption requirements and with less wear on the production equipment than the state of the art technology allows.

Using the new manufacturing techniques, whole sealing gaskets can be produced with both larger metallic inserts and smaller serrated structures for internal joint systems in fluid pipeline applications. Special metal injection molding (MIM) techniques are utilized in the manufacturing process which have, to Applicant's knowledge, not been used before in the waterworks industry for gripping and sealing components. These special MIM techniques have a number of unique attributes. The resulting gripping structures or elements produced with these techniques are heavier structures with better dimension control, density and structural properties than has been achieved in the past in the particular industries of concern. In the area of fluid pipelines, particularly plastic pipelines, the result is a less expensive sealing and restraint joint structure with heavy elements that are high density, hard, sharply serrated and durable and which are also produced with less material and process costs. There is less equipment wear and more reliable density, as well as more dimensional control in the final product dimensions than the current state of the art products.

Current state of the art metal injection molding techniques used in other industrial processes are complicated and typically result in an almost 20% shrinkage rate between the green part (fresh out of the mold) and the brown, sintered part (after the sintering process is over). This high shrinkage leads to poor dimensional control which often leads to structural uncertainties and even part failure during sintering, consequently the size of the brown sintered parts has generally been limited to a few hundred grams.

However, the techniques used in making the parts of the invention allow for the manufacture of gripping elements which are much larger in size. The new molding techniques, to be described hereafter, make use of a metal-polymer composites made according to what will be referred to in the description which follows as "the Tundra® Technology." As will be further described, the composite mixtures made according to the Tundra® Technology allows for an outstanding dimension control of the final product, resulting in a shrinkage between the green product and the brown product of less than 10% by weight after sintering. This is a 200% better dimensional control than the current state of the art technology achieves. As a result, not only are very accurate parts obtained, with little or no need for machining and very sharp teeth which meet or exceed specifications, but it is also possible to produce very heavy parts, up to six times what current technological standards achieve. This low shrinkage ratio means that the green part is basically near final shape and allows the serrated products to retain an outstanding tooth sharpness. As mentioned, metal injection molding (MIM) has previously been reserved for products smaller than about, for example, 200 grams. Current state of the art does not allow for larger parts due to the poorly controlled and very pronounced shrinkage which causes distortion and fracturing during the sintering process.

It is also possible to have much easier debinding of the composite mix with the newly developed technology, as opposed to the state of the art technology. A simple debinding through surface evaporation takes place during the sintering process. The low shrinkage rate allows for a very controlled sintering, without part deformation or failure.

In one preferred form, the process of the invention can be described in the following steps:
1. Creating a 3D printed metallic mold of the part that will be fabricated.
2. Injection molding of the Tundra® plasticized feedstock with the aid of an injection molding machine.
3. Thermally debinding and sintering of the green part, combined in one step in an industrial oven.
4. Performing minimum finish machining if needed to obtain the final part.
5. Incorporating the finished part into the pipe sealing and restrained joint system.

Because of the outstanding dimension control, it is possible to obtain a finished part that is virtually identical to the non-sintered part, with only a maximum of 10% shrinkage, and a brown part with teeth sharpness well above the specifications without the necessity for further machining.

The gripping elements can be used as is or further hardened according to the techniques of the invention and then be incorporated into a sealing and restraint system which is, for example, used in the waterworks industry to form sealing pipe joints in water or sewer pipelines. In its preferred form, a pipe sealing gasket is shown which is designed for receipt within a raceway provided within a female bell socket end of a thermoplastic pipe. The hardened gripping elements which are formed according to the teachings of the invention are incorporated into the gasket, or form part of a companion restraint system which cooperates with the sealing gasket in forming a sealed and restrained joint for the fluid pipeline.

Additional features and advantages will be apparent in the written description which follows.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

As has been briefly discussed, the hardened gripping elements formed using the manufacturing techniques of the present invention can find wide applicability as components of sealed pipe joints in the waterworks industry and other industries. The discussion which follows will focus primarily on sealed and restrained pipe joints of the type used, for example, in the fluid flow pipelines used in municipal water lines and sewer lines. However, it should be understood that the joint structures to be described could also find applicability in other industrial areas, such as in fluid pipelines used in the oil and gas industry, various chemical process industries, and the like.

Figure 1:
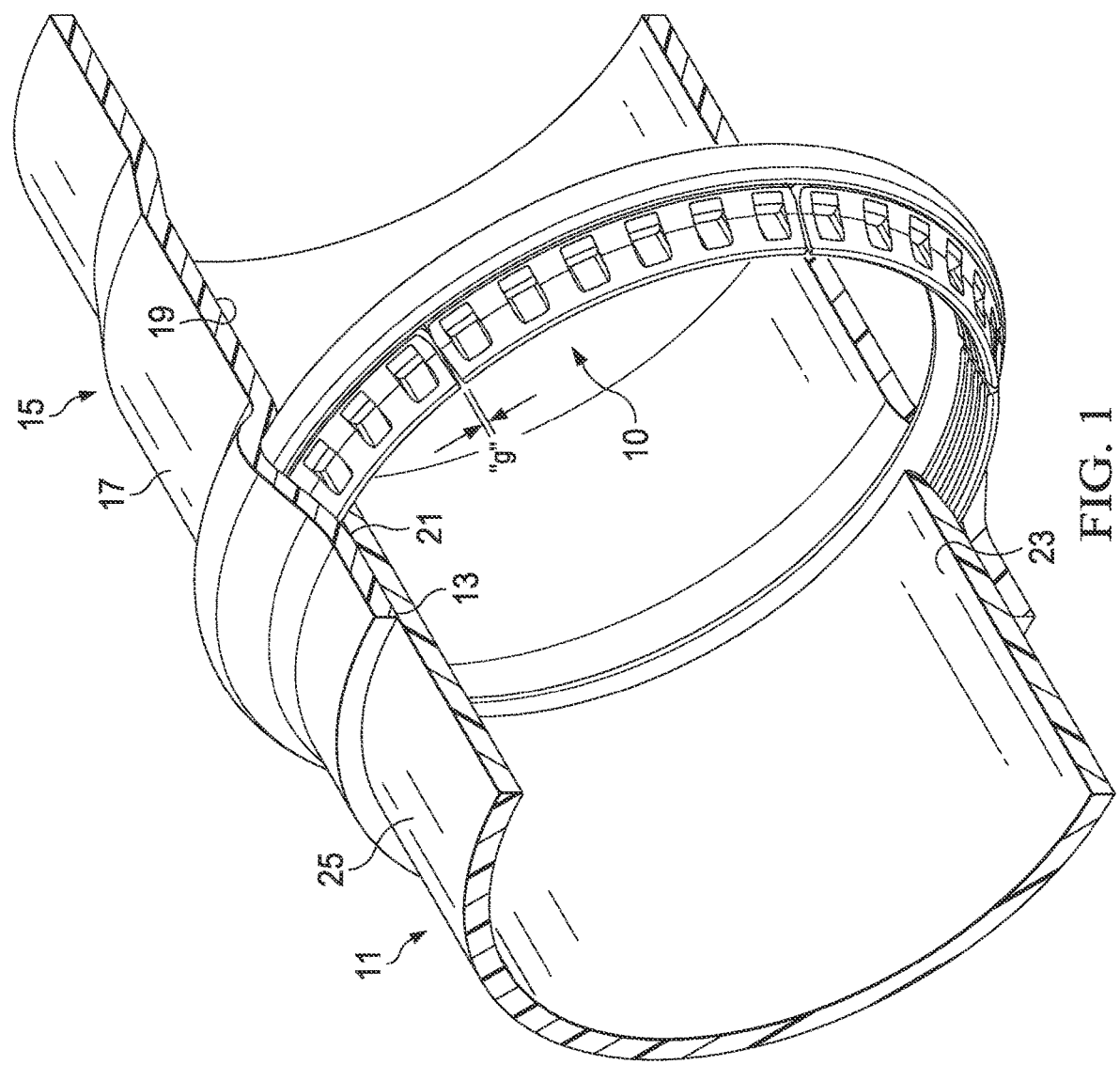
FIG. 1 is a side, partial cross sectional view of a pipe joint formed using sealing and restraint elements formed according to the manufacturing principles of the present invention.

A finished sealing and restraint mechanism of the type under consideration will now be described, by way of example. With reference to FIG. 1, there is shown, in quarter sectional fashion, a male or spigot pipe end 11 of one section of PVC-O pipe about to be inserted into the mouth or end opening 13 of a socket or bell pipe end 15 of a second, female mating section of PVC-O pipe of the type used in the waterworks industry. The female pipe section 15 has an exterior surface 17, an interior surface 19 and having an interior circumferential recess or groove 21, sometimes referred to as a "raceway" formed in the belled pipe end adjacent the mouth opening on the interior surface thereof. The circumferential groove or raceway 21 is formed during the manufacture of the plastic pipe. Thereafter, a sealing and restraining gasket 10 is installed within the raceway. It will be understood by those skilled in the relevant arts that the gasket could also be of the type which is installed integrally with the formation of the raceway in the female, belled pipe end, as in a Rieber style pipe manufacturing process.

The mating male section of plastic pipe or spigot 11 has an interior surface 23 and exterior surface 25. In the view shown in FIG. 1, the male pipe section 11 is beginning the insertion step within the mouth opening of the female pipe section 15 to form a sealed pipe joint.

Figure 2:
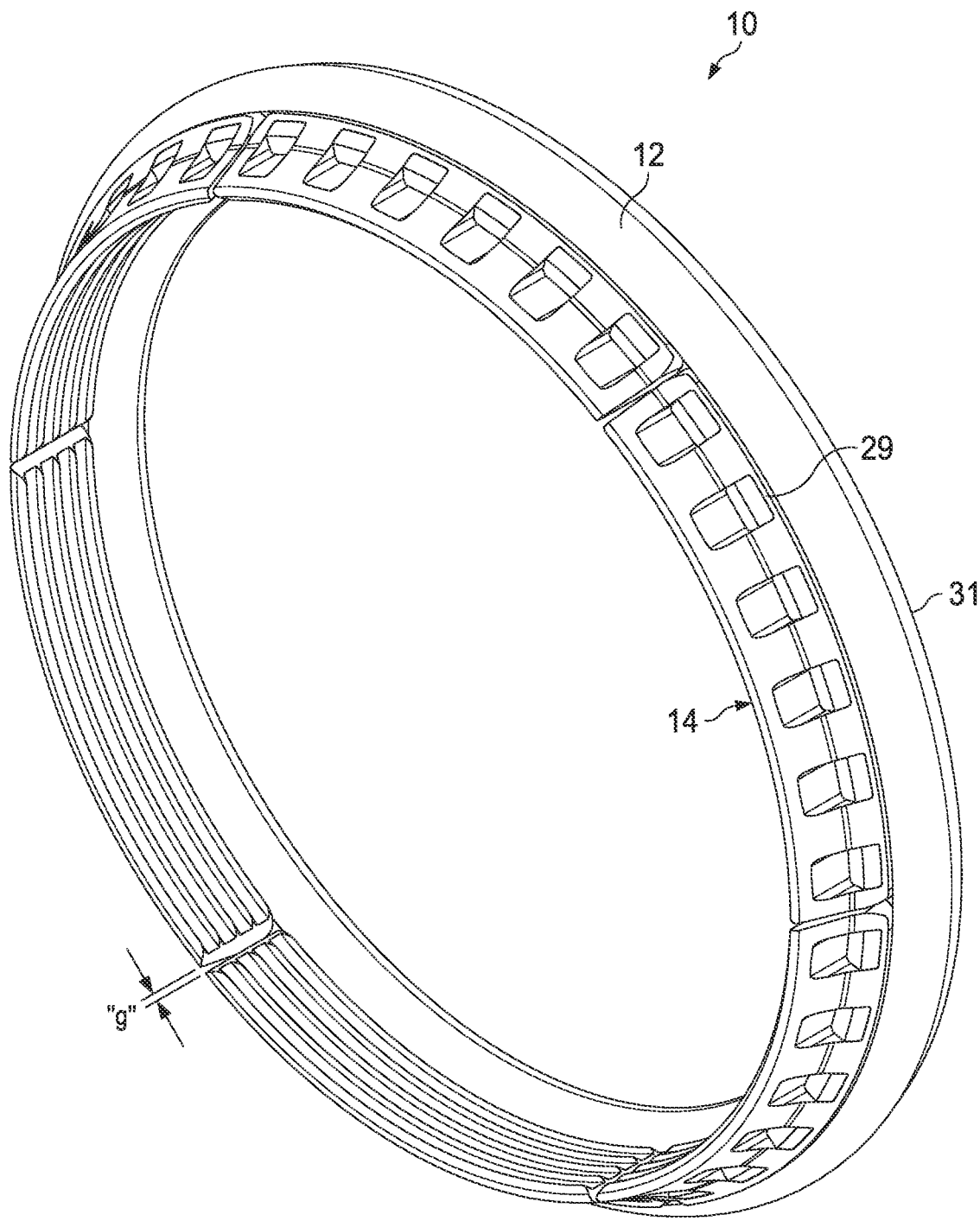
FIG. 2 is an isolated, perspective view of the sealing and restraint element used in the pipe joint of FIG. 1.

The sealing and restraint gasket 10 is shown in perspective in FIG. 2 of the drawings. The sealing and restraint element 10 is comprised of an inner ring-shaped elastomeric body 12 joined to a series of hardened arcuate gripping segments (such as segment 14 in FIG. 2). The ring-shaped elastomeric body 12 has an inner circumferential region 29 and an outer circumferential region 31, the outer circumferential region being arranged to form a seal with the interior surface of the belled end of the female pipe section while the inner circumferential region forms a sealing surface for the exterior surface of the mating male pipe section.

The elastomeric portion 12 of the sealing and restraint system of the invention provides the primary sealing capacity for the pipe joint. The main rubber portion of the gasket can be, for example, styrene butadiene rubber (SBR), ethylene propylene diene rubber (EPDM), acrylonitrile-butadiene rubber (NBR), nitrile rubber, etc., and the manufacture of such sealing bodies is well known by those skilled in the relevant arts. The Durometer of the rubber used will vary according to the end application but will generally have a Shore A hardness in the range from about 40 to 65.

The gripping segments 14 (FIG. 2) are typically formed of a metal such as iron or a steel, such as stainless steel. The number of gripping segments will vary depending upon the diameter of the sealing and gripping assembly. For the example of FIG. 3 where the annular gasket body 12 has an eight inch diameter, six separate gripping segments 14 are shown extending outwardly around the circumference of the gasket body. The gaps "g" between the metallic gripping segments 14 provide some degree of flexibility for the assembly, thereby facilitating its installation within the mouth region of the female pipe section.

Figure 3:
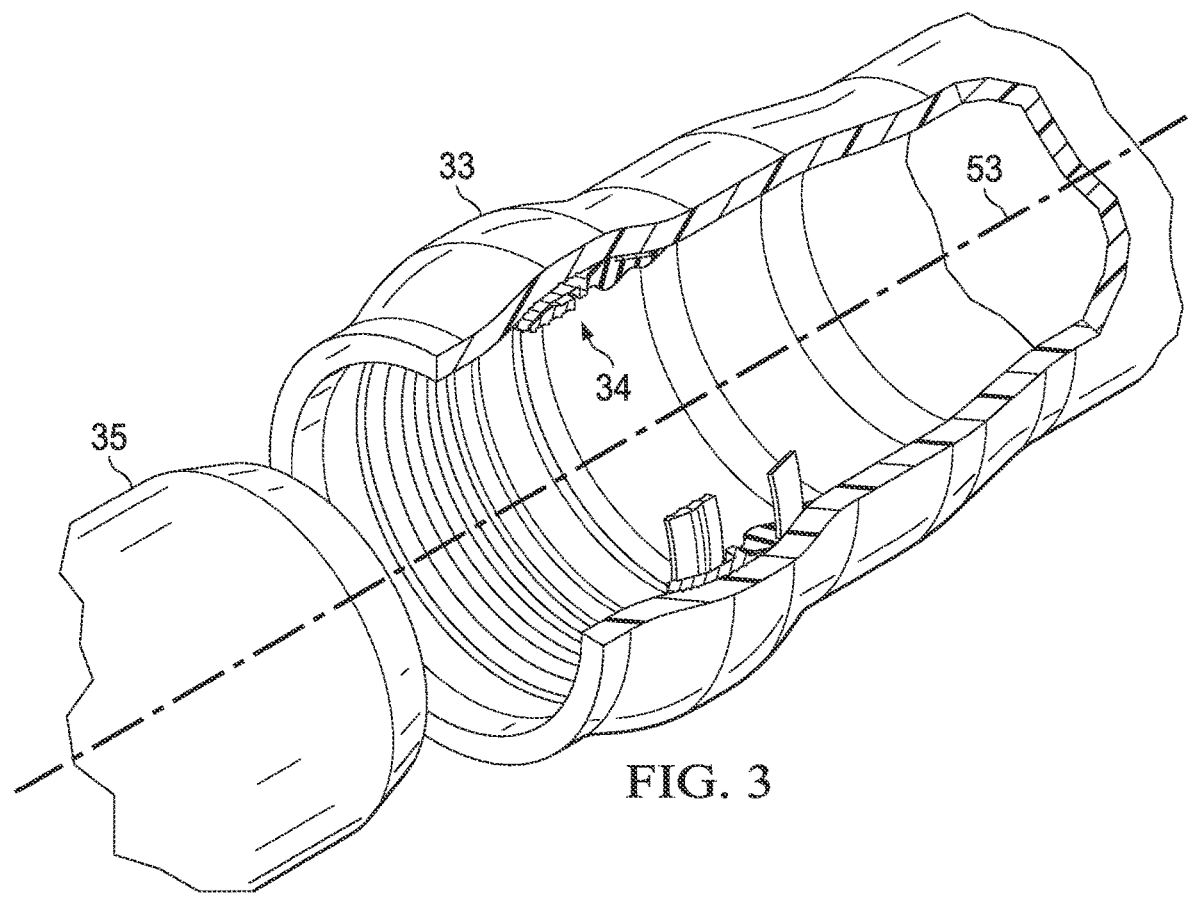
FIG. 3 is a view, similar to FIG. 1, of another pipe joint using sealing and restraint elements formed according to the manufacturing principles of the invention.
Figure 4:
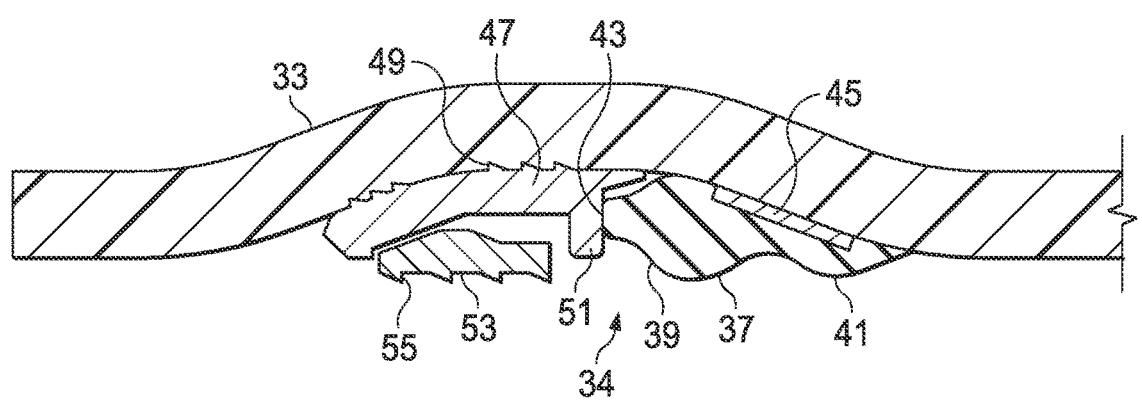
FIG. 4 is a side, quarter sectional view of the sealing and restraint element of FIG. 3 located in a groove of the female, bell pipe end.

While the sealing and restraint system shown in FIGS. 1 and 2 uses a hardened gripping element which is combined with or an integral sealing element, it is also possible that the hardened gripping elements could be separate from, but associated or cooperative with the sealing element of the system. FIGS. 3 and 4 show such a sealing and restraint system in which the hardened gripping elements are separate.

FIG. 3 is an exploded view of a plastic pipe joint in which a belled female pipe end 33 is provided with an annular groove for receiving the sealing and restraint system, designated generally as 34 in FIGS. 3 and 4. The system shown is sold commercially as the Bulldog® Sealing and Restraint System. The integral sealing and restraint system shown is capable of joining and sealing the female plastic pipe end 33 to the spigot end 35 of a mating male plastic pipe section. The plastic pipe male and female ends can be made from any convenient synthetic material including the polyolefins such as polyethylene and polypropylene but are preferably made from polyvinyl chloride (PVC).

As best seen in FIG. 4, the sealing and restraint system includes an elastomeric, circumferential sealing ring 37 which is formed as an elastomeric body. The annular sealing ring 37 is somewhat tear drop shaped in cross section and includes a bulbous end region 39 and a thinner forward most region 41. The bulbous end region 39 terminates in a nose portion 43. The sealing portion of the gasket contacts the exterior surface of the mating male pipe section upon assembly of the joint. The sealing member is preferably made of a resilient elastomeric or thermoplastic material. In the particular case shown, the sealing ring 37 has a metal reinforcing band 45 about the outer circumference thereof. However, any number of specialized sealing rings can be utilized in order to optimize the sealing and restraining actions of the assembly.

The seal portion of the assembly also includes a companion restraining mechanism which allows movement of the mating male pipe relative to the belled end of the female pipe 33 in a first longitudinal direction but which restrains movement in a second, opposite relative direction. In the particular case shown, the companion restraining mechanism includes a ring shaped housing 47. The ring shaped housing provides radial stability and reinforcement for the male (spigot) pipe end 35 during makeup of the joint.

Although the housing could have a circumferential opening, it is preferably provided as a solid ring of a slightly larger internal diameter than the forming mandrel where a Rieber style manufacturing process is used to integrally install the housing during manufacture of the pipe joint. Alternatively, the housing could be used with some form of collapsible forming mandrel, in which case its internal diameter might approach or exceed that of the mandrel in certain of its states of operation.

The exterior of the housing 18 may be equipped with one or more rows of gripping teeth 49 for engaging the surrounding pipe groove. The corresponding grooves or indentations in the pipe interior may be formed during the belling operation as the pipe cools. The ring shaped housing 47 is preferably formed of a material selected from the group consisting of metals, alloys, elastomers, polymeric plastics and composites and is rigid or semi-rigid in nature. The housing external shoulder 51 is substantially perpendicular to the longitudinal axis 53 of the female pipe. The external shoulder 51 is in contact with the nose region of the elastomeric body of the sealing ring 37 as the mating male pipe is inserted into the mouth opening of the female belled pipe end 33.

The housing 47 used in the sealing and restraining system of FIGS. 3 and 4 also includes a companion ring-shaped gripping insert 53 which is manufactured according to the principles of the invention and which is received in complimentary fashion and contained within the circumferential interior region of the housing 47. The gripping insert 53 is a ring shaped body which as at least one row of gripping teeth 55 on an interior circumferential surface thereof. In the version of the restraining system shown in FIG. 4, the gripping insert has four rows of teeth. The rows of teeth are arranged for engaging selected points on the exterior surface of the mating male pipe section 35. Contact with the exterior surface of a mating male pipe causes the gripping insert 53 to ride along the male pipe exterior surface at an angle while the row of gripping teeth 55 on the gripping insert internal surface engage the exterior surface of the mating male pipe.

The gripping insert ring 53 was, in the past, formed of a hard metal, such as corrosion resistant stainless steel, or from other metallic materials or alloys. It was generally necessary to machine the gripping inserts from bar stock, or the like. Unlike the prior art methods, the method of manufacturing hard gripping elements of the invention involves a metal injection molding process. In its most elemental form, the method involves the steps of:

providing a metal polymer composite mix, the composite comprising a metal particulate phase and a polymer phase;

forming a green metal composite article by either extruding the composite mix or molding the composite mix into a metal polymer composite article having at least one gripping surface having a plurality of gripping teeth; and thermally debinding and sintering the green metal composite article to produce a finished or near finished hardened gripping element.

The Tundra® Technology:

The method of the invention is enabled by utilizing a new metal injection molding (MIM) technology developed by Tundra Composites, LLC, which is described, for example, in issued U.S. Pat. No. 9,512,544, issued Dec. 6, 2016, to Heikkila, and in issued U.S. Pat. No. 10,328,491, issued Jun. 25, 2019, to Heikkla, as well as in other references. The disclosure of both of these issued U.S. Patents is hereby expressly incorporated herein in their entirety by reference. The enabling technology which is described therein will be referred to in the discussion which follows as using "interfacially modified particulate and polymer composite materials" as described in the "Tundra® patents."

The interfacially modified particulate and polymer composite materials described in the Tundra® patents can be used in injection molding processes, such as metal injection molding and additive process such as 3D printing. These unique materials are especially well adapted for powder metallurgy processes. Improved products are provided under process conditions through surface modified powders that are produced by extrusion, injection molding, additive processes such as 3D printing, press and sinter, or rapid prototyping.

For purposes of the discussion which follows, the following terms will have the meanings described below:

Binder:

For the powder injection molding, metal injection molding or additive manufacturing techniques described herein, the particulate material such as metal particulates are mixed with other materials such as organic substances. These organic substances are, such as for example polymers, are referred to generally as "binders". The use of polymer as a binder varies according to the processing method and the particulate mixture. Binders give the green body a sufficient strength by associating particles at their boundary surfaces. Usually those binders are used as plastification agents. They make possible the flow of the particulate during processes such as extruding, injection molding, and additive manufacturing.

Binder systems include thermoplastic systems of the type originally developed for injection molding machines in the plastics industry. Thermoplastic systems are exemplified, for example, by paraffin, wax, polyolefin wax materials; thermoplastic resins such as polyolefin, polypropylene (PP), polyethylene (PE), polyacetal, polyoxymethylene (POM). Molecular chains of polyolefin thermoplastic, polypropylene (PP) and polyethylene (PE) resins are much longer than those of waxes. This difference arises in higher binding forces of thermoplastics and as a consequence a higher melting viscosity and melting point.

Debinding:

Before sintering green bodies, the debinding process of the polymers must be performed. The removal of the binder is via degradation, extraction or evaporation via the surface channels in the green body. Debinding the part may be done via thermal, solvent or catalytic methods. Binder material is chosen, at least in part, based on the selection of the debinding method. The composite material of the embodiment, comprising particulate that is coated with interfacial modifier, improves the debinding process by allowing debinding to proceed more quickly and efficiently than particulate that is uncoated. The higher volume or weight fractions of the coated particulate permits the use of less binder in the part or object, and the rheology and melt flow of the composite material provide for the part or object to be more quickly formed. Such higher particulate fractions are not possible with uncoated particulate.

The temperatures for thermal debinding generally vary between 60° C. and 600° C. Organic polymers have to be removed completely from the green body, since carbon delays and can influence the sintering process. Further the qualities of the final product can be negatively impacted by residual carbon from the polymer.

Sintering:

"Sintering is the process whereby particles bond together typically below the melting point by atomic transport events. A characteristic feature of sintering is that the rate is very sensitive to temperature. The driving force for sintering is a reduction in the system free energy, manifested by decreased surface curvatures, and an elimination of surface area. The interfacial modifier on a particle surface may cooperate in the sintering process to the level of fusing with other interfacial modifier coatings on other particles to form the sintered product. The interfacial modified surfaces that fuse or sinter may be the same or different relative to the organo-metallic interfacial modifier. Further, the grain boundary, the interface between particles, may fuse or sinter as well.

Three Dimensional (3D) Printing:

Additive manufacturing or "3D printing" is a manufacturing process for making a three-dimensional solid object of virtually any shape from a digital model. 3D printing is achieved using an additive process, where successive layers of material are laid down in different shapes. 3D printing is considered distinct from traditional machining techniques, which mostly rely on the removal of material by methods such as cutting or drilling (subtractive processes). A materials printer usually performs 3D printing processes using digital technology. The 3D printing technology is used for both prototyping and distributed manufacturing. The technology was developed in the late 1980s and was commercialized in the 1990s.

Example of the Method of the Invention

The use of the previously described Tundra composites in manufacturing a gripping element of the invention will now be described. The method of the invention utilizes a metal composite body which, in one form, is formed by an extrusion process at a suitable temperature and shear rate to form an extruded metal composite body having a required density and shrinkage characteristics. In one preferred form, the metal composite body is formed by molding using either a compression molding or injection molding process. The metal particulate phase is made up of particles having a given density and size distribution and wherein an interfacial modifier material is also added to form the composite mix, as has been described in the Tundra® patents. In one preferred embodiment of the invention, the particles are formed of stainless steel and the polymer phase is comprised of a polyolefin polymer such as polypropylene. The metal particulate phase makes up about 50 to 95% by volume of the particulate mix, most preferably about 74% by volume or greater.

The preferred method of the invention, as has briefly been described in the Summary of the Invention, will typically include at least the following process steps:

1 Creating a 3D printed metallic mold of the part which will ultimately be fabricated or a mold produced by normal machining methods from tool steel.
2. Injection molding of the plasticized feedstock (for example, Tundra® Dynamic LS-316L-02) with the aid of an injection molding machine.
3. Thermally or chemically debinding and sintering of the green part, combined in one step in an industrial oven. Optionally hardening the part.
4. Minimal machining, where needed, to obtain a finished part.

The finished part may then be incorporated into the pipe sealing and restrained joint system of the type previously described.

The following example is illustrative of the steps involved in one preferred embodiment of the invention.

Production of Prototypes with a Composite of 96 wt % 420 Stainless Steel with 4% Polypropylene A composite obtained from Tundra® Composites, LLC, White Bear Lake, Minnesota, (Tundra® Dynamic LS-420-01 with 96 wt % 420 stainless steel) is used as a starting material. The composite is injection molded into a green part, as by utilizing a Haixing Plastic Molding Machine, with a theoretical shot volume of 135 cm$^3$, gross power of the machine of 19 KW and 440 V and 60 Hz. It is injected with an injection temperature profile of 175° 180° 185° 200° C. from the base of the screw to the juncture of the mold. The mold has a temperature of 80° C. and the packing pressure is 110 bar, with a packing time of 10 seconds.

After injection, the green part is then sintered at a temperature of about 1200° F. Resulting shrinkage between green and sintered parts is of only about 5% in many cases. The parts are hardened to Rockwell C of approximately 55-57. The brown parts are then lightly machined to produce the final parts.

Figure 5:
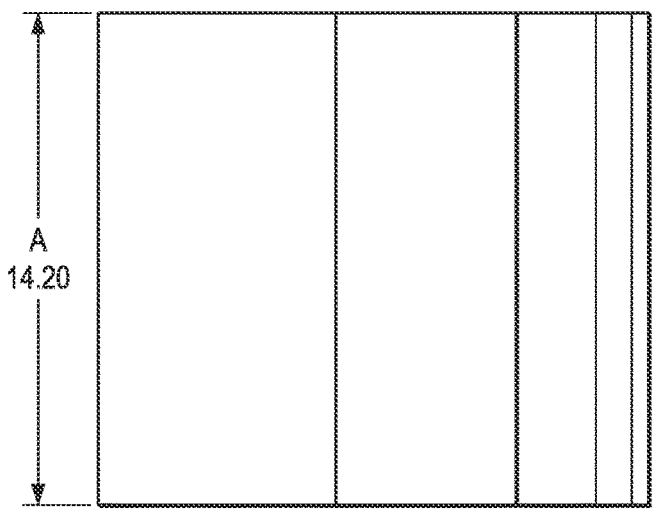
FIGS. 5 and 6 are isolated views of a gripping element manufactured according to the principles of the invention showing the relative dimensions before and after sintering with reference letters being correlated to data presented in the written description which follows.
Figure 6:
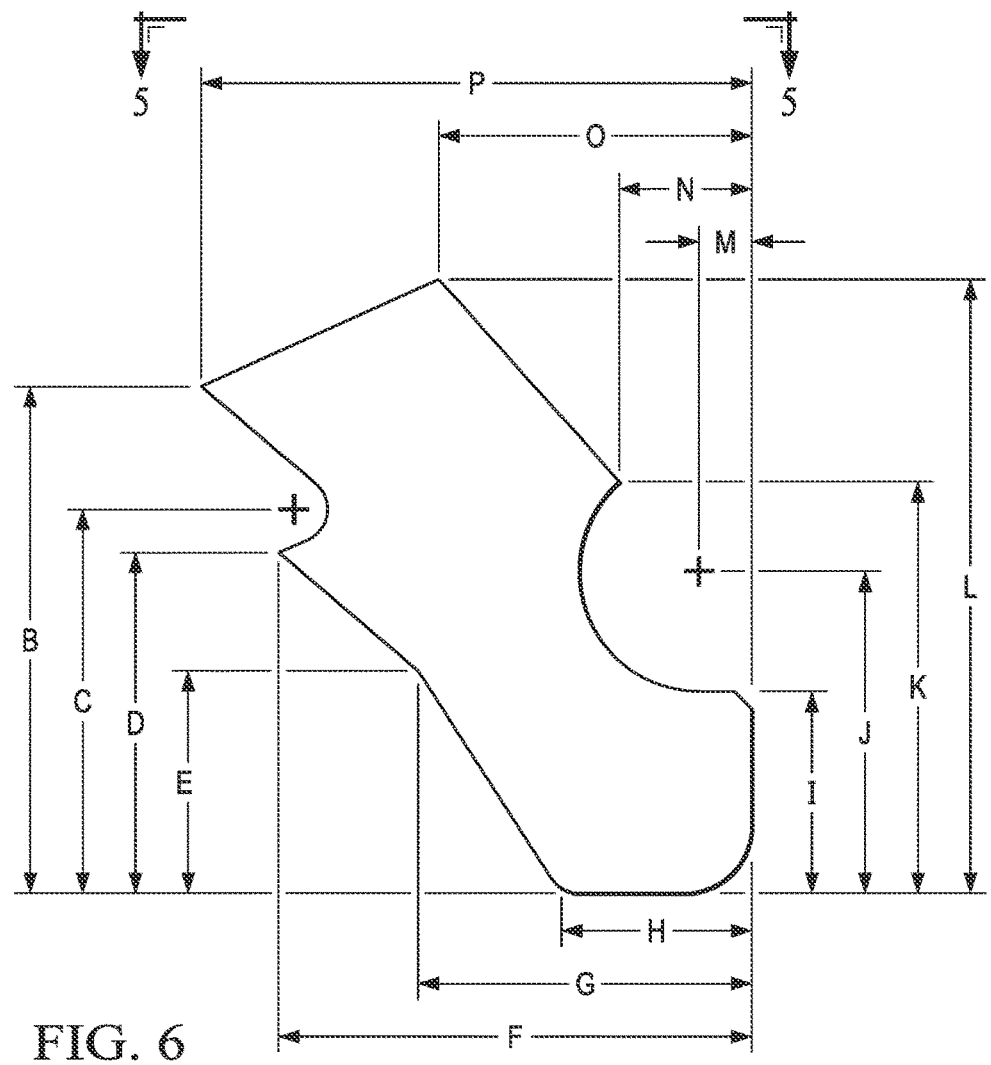

Shrinkage and Dimensional Control:

Shrinkage and dimension control are paramount part of the process. As a result, a number of different control measures have been defined for the end products produced by the methods of the invention. FIGS. 5 and 6 show various dimensional parameters defined by the end products, in this case a hardened gripping element. Some twenty two different measures are defined for dimension and shrinkage control. The following Table I summarizes how the article shrinks during the sintering process:

TABLE I

| Measure | Unsintered Avg. | Unsintered Std.Dev. | Sintered Avg. | Sintered Std.Dev. | Shrinkage (%) |
|---|---|---|---|---|---|
| A | 14.81 | 0.041 | 14.02 | 0.071 | 5.31 |
| B | 15.05 | 0.101 | 14.38 | 0.096 | 4.44 |
| C | 11.48 | 0.076 | 10.91 | 0.075 | 4.96 |
| D | 10.14 | 0.092 | 9.69 | 0.086 | 4.42 |
| E | 6.53 | 0.070 | 6.19 | 0.084 | 5.16 |
| F | 14.06 | 0.077 | 13.31 | 0.107 | 5.31 |
| G | 9.97 | 0.058 | 9.39 | 0.124 | 5.84 |
| H | 5.75 | 0.075 | 5.41 | 0.048 | 5.93 |
| I | 6.10 | 0.040 | 5.85 | 0.072 | 4.05 |
| J | 9.69 | 0.043 | 9.30 | 0.092 | 4.01 |
| K | 12.25 | 0.044 | 11.74 | 0.078 | 4.14 |
| L | 18.37 | 0.067 | 17.50 | 0.059 | 4.72 |
| M | 1.56 | 0.061 | 1.48 | 0.061 | 5.00 |
| N | 4.17 | 0.064 | 3.96 | 0.078 | 5.08 |
| O | 9.41 | 0.134 | 8.90 | 0.171 | 5.41 |
| P | 16.41 | 0.109 | 15.53 | 0.168 | 5.36 |

It is apparent that none of the length measures shrink more than 5.93% in any given direction. At this point, a maximal theoretical shrinkage of 6% is therefore achieved.

The exceptional dimension control is illustrated by the following Table II:

TABLE II

| Measure | Unsintered Avg. | Unsintered Difference to nominal value | Unsintered Std.Dev. | Sintered Avg. | Sintered Difference to nominal value | Sintered Std.Dev. |
|---|---|---|---|---|---|---|
| A | 14.81 | 0.61 | 0.041 | 14.02 | −0.18 | 0.071 |
| B | 15.05 | 0.58 | 0.101 | 14.38 | −0.08 | 0.096 |
| C | 11.48 | 0.58 | 0.076 | 10.91 | 0.01 | 0.075 |
| D | 10.14 | 0.52 | 0.092 | 9.69 | 0.07 | 0.086 |
| E | 6.53 | 0.21 | 0.070 | 6.19 | −0.13 | 0.084 |
| F | 14.06 | 0.49 | 0.077 | 13.31 | −0.26 | 0.107 |
| G | 9.97 | 0.33 | 0.058 | 9.39 | −0.25 | 0.124 |

TABLE II-continued

| | Unsintered | | | Sintered | | |
|---|---|---|---|---|---|---|
| Measure | Avg. | Difference to nominal value | Std.Dev. | Avg. | Difference to nominal value | Std.Dev. |
| H | 5.75 | 0.21 | 0.075 | 5.41 | −0.13 | 0.048 |
| I | 6.10 | 0.30 | 0.040 | 5.85 | 0.05 | 0.072 |
| J | 9.69 | 0.41 | 0.043 | 9.30 | 0.03 | 0.092 |
| K | 12.25 | 0.49 | 0.044 | 11.74 | −0.02 | 0.078 |
| L | 18.37 | 0.76 | 0.067 | 17.50 | −0.11 | 0.059 |
| M | 1.56 | 0.02 | 0.061 | 1.48 | −0.06 | 0.061 |
| N | 4.17 | 0.18 | 0.064 | 3.96 | −0.03 | 0.078 |
| O | 9.41 | 0.33 | 0.134 | 8.90 | −0.18 | 0.171 |
| P | 16.41 | 0.58 | 0.109 | 15.53 | −0.30 | 0.168 |

The measurements A-P were taken in the locations illustrated in FIG. 6 of the Drawings.

The Tables which follow summarize additional data for three commercial products with gripping elements made according to the manufacturing processes of the invention:
1. 316 L SS Bulldog® Style rings;
2. 420 SS Sure Stop™ gripping segments; and
3. 316 L SS Turner™ DN200 gripping segments.

Bulldog® Gripping Ring Density and Hardness:

A number of "almost finished" Bulldog gripping rings were injection molded using the techniques of the invention. The measured hardness of the rings is shown in Table III below. Total material savings when comparing to machining from tubes is 69%.

TABLE III

| | | Hardness | | | | | | |
|---|---|---|---|---|---|---|---|---|
| | Material | #1 | #2 | #3 | #4 | #5 | Avg. | Std. Dev |
| HRB | 316 SS | 68 | 68 | 68 | 71 | 70 | 69 | 1.41 |
| | | 72 | 68 | 70 | 73 | 68 | 70 | 2.28 |

Hardness values of 68-72 are observed which correlate well with the nominal Hardness for 316 L SS found in literature.

The measured density of the Bulldog® gripping rings was 7.6 g/cc.

Bulldog® Gripping Ring Dimensional Analysis and Concentricity:

The inner and outer diameters were measured across three different lines in the Bulldog® gripping rings. An excellent concentricity of 99.75 for green parts and 99.4-99.6 for sintered parts was observed. The height was also measured. On average, a shrinkage of 8.6% was observed for the part. Three Bulldog® gripping rings were cut to final shape. No concentricity was lost after machining whatsoever, which implies that there are no residual stresses after the injection—sintering process. No warping or loss of shape of any type was observed.

Bulldog® Gripping Ring Stress Strain Data on the Sintered 316 L SS:

Stress-Strain analysis was conducted with a Tensometer and an Extensometer from the INSTROM brand. The results are in agreement with MPIF standards, with a Maximal Tensile Strength of 505 MPa and a maximal elongation of 75%.

Sure Stop™ Gripping Elements–8" to 12":

Sure Stop™ 8"-12" segments were injected and subsequently sintered at Tundra® Composites. No machining was involved in the production of these inserts. Dimensional, hardness and density analyses were conducted. Dimensional analysis is conducted with selected dimensions. Tolerances are +−0.08 mm. Hardness is expected at 49 HRC+−4

Sure Stop™ 8"-12": Dimensional Analysis of Green Part:

The dimensions of the green part are controlled within tolerance ranges (0.16 mm). The teeth are measured under 0.13 mm sharpness for 10 specimens, which corroborates that direct injection as finished product should be possible. Weight Control is also excellent. For the selected dimensions, an excellent dimensional control was obtained. Maximal ranges stay under the 0.16 mm limit. The results are shown in Table IV:

TABLE IV

| | Dimensions in [mm] | | | | | | | |
|---|---|---|---|---|---|---|---|---|
| PART | ITEM | | | | | | | Weight |
| TAG No. | B | D | F | I | K | N | P | [g] |
| 1 | 15.21 | 10.08 | 14.30 | 6.19 | 12.37 | 14.14 | 16.82 | 13.00 |
| 2 | 15.19 | 10.03 | 14.38 | 6.13 | 12.29 | 14.20 | 16.91 | 13.00 |
| 3 | 15.11 | 10.04 | 14.35 | 6.15 | 12.33 | 14.17 | 16.90 | 13.01 |
| 4 | 15.07 | 10.00 | 14.39 | 6.11 | 12.27 | 14.18 | 16.91 | 13.03 |
| 5 | 15.20 | 10.12 | 14.29 | 6.21 | 12.32 | 14.13 | 16.82 | 13.02 |
| 6 | 15.19 | 10.14 | 14.31 | 6.21 | 12.37 | 14.14 | 16.83 | 13.03 |
| 7 | 15.21 | 10.11 | 14.34 | 6.14 | 12.32 | 14.13 | 16.82 | 13.05 |
| 8 | 15.21 | 10.10 | 14.30 | 6.22 | 12.33 | 14.14 | 16.82 | 13.05 |
| 9 | 15.13 | 10.08 | 14.33 | 6.15 | 12.28 | 14.16 | 16.87 | 13.00 |
| 10 | 15.11 | 10.00 | 14.33 | 6.22 | 12.31 | 14.23 | 16.90 | 13.05 |
| AVG | 15.16 | 10.07 | 14.33 | 6.17 | 12.32 | 14.16 | 16.86 | 13.02 |
| STD DEV | 0.05 | 0.05 | 0.03 | 0.04 | 0.03 | 0.03 | 0.04 | 0.02 |
| RANGE | 0.14 | 0.14 | 0.10 | 0.11 | 0.10 | 0.10 | 0.09 | 0.05 |

Sure Stop™ 8"-12": Dimensional Sintered Parts:

The test results in Table V show that it is possible to direct inject with final teeth sharpness. HRC Hardness respects and surpasses specified values. There is good dimensional control in most dimensions.

TABLE V

| | | | | | | | | | | | | | | |
|---|---|---|---|---|---|---|---|---|---|---|---|---|---|---|
| MINIMUM | 45 | 13.90 | 14.38 | 9.54 | 6.24 | 13.49 | 9.56 | 5.72 | 11.68 | 17.53 | 3.91 | 9.00 | 15.75 | RADIUS |
| MAXIMUM | 53 | 14.30 | 14.54 | 9.70 | 6.40 | 13.65 | 9.72 | 5.88 | 11.84 | 17.69 | 4.07 | 9.16 | 15.91 | 0.13 |

| PART TAG | | | | | | | ITEM | | | | | | | |
|---|---|---|---|---|---|---|---|---|---|---|---|---|---|---|
| No. | HRC | A | B | D | E | F | G | I | K | L | N | O | P | V (1) |
| 1 | 57 | 14.06 | 14.16 | 9.35 | 6.38 | 13.31 | 9.43 | 5.72 | 11.51 | 17.18 | 3.82 | 8.75 | 15.74 | 0.13 |
| 2 | 55 | 13.99 | 14.08 | 9.31 | 6.33 | 13.41 | 9.44 | 5.77 | 11.54 | 17.21 | 3.92 | 9.00 | 15.80 | 0.13 |
| 3 | 53 | 14.12 | 14.20 | 9.35 | 6.32 | 13.36 | 9.44 | 5.83 | 11.60 | 17.20 | 3.89 | 8.74 | 15.76 | 0.13 |
| 4 | 55 | 14.08 | 14.06 | 9.33 | 6.24 | 13.48 | 9.59 | 5.74 | 11.52 | 17.10 | 4.00 | 8.92 | 15.82 | 0.10 |
| 5 | 52 | 13.93 | 13.94 | 9.25 | 6.24 | 13.47 | 9.57 | 5.76 | 11.58 | 17.10 | 4.00 | 9.01 | 15.87 | 0.13 |
| 6 | 56 | 13.97 | 14.08 | 9.33 | 6.27 | 13.38 | 9.54 | 5.80 | 11.57 | 17.20 | 3.95 | 8.86 | 15.78 | 0.11 |
| 7 | 58 | 14.03 | 14.01 | 9.26 | 6.23 | 13.36 | 9.40 | 5.73 | 11.50 | 17.21 | 4.00 | 8.94 | 15.75 | 0.10 |
| 8 | 59 | 13.98 | 14.03 | 9.30 | 6.38 | 13.42 | 9.50 | 5.84 | 11.50 | 17.17 | 3.95 | 9.03 | 15.80 | 0.13 |
| 9 | 58 | 13.96 | 14.01 | 9.25 | 6.40 | 13.40 | 9.60 | 5.86 | 11.60 | 17.17 | 4.01 | 9.00 | 15.88 | 0.11 |
| 10 | 58 | 14 | 14.00 | 9.22 | 6.27 | 13.45 | 9.44 | 5.86 | 11.60 | 17.20 | 4.02 | 9.14 | 15.86 | 0.13 |
| 11 | 60 | 14.04 | 14.08 | 9.33 | 6.31 | 13.42 | 9.51 | 5.72 | 11.58 | 17.22 | 3.99 | 8.94 | 15.75 | 0.10 |
| 12 | 58 | 14.02 | 14.15 | 9.33 | 6.29 | 13.39 | 9.48 | 5.80 | 11.54 | 17.18 | 3.89 | 8.80 | 15.76 | 0.23 |
| 13 | 58 | 14.03 | 14.16 | 9.30 | 6.35 | 13.33 | 9.43 | 5.74 | 11.51 | 17.22 | 4.00 | 8.78 | 15.75 | 0.23 |
| 14 | 57 | 14.01 | 14.03 | 9.31 | 6.28 | 13.40 | 9.50 | 5.81 | 11.56 | 17.21 | 4.01 | 8.96 | 15.81 | 0.18 |
| AVG | 58 | 14.02 | 14.07 | 9.30 | 6.31 | 13.40 | 9.49 | 5.78 | 11.55 | 17.18 | 3.96 | 8.92 | 15.80 | |
| STD DEV | 2 | 0.05 | 0.07 | 0.04 | 0.06 | 0.05 | 0.06 | 0.05 | 0.04 | 0.04 | 0.06 | 0.12 | 0.05 | |
| RANGE | 8 | 0.19 | 0.26 | 0.13 | 0.17 | 0.17 | 0.20 | 0.14 | 0.10 | 0.12 | 0.20 | 0.40 | 0.14 | |

Sure Stop™ Gripping Elements 8"-12": Density:

Density measurements were taken and compared with production gripping inserts. The data is shown in Table VI.

TABLE VI

| | 8"-12" Sure Stop ™ | | Production insert |
|---|---|---|---|
| Sample | Weight [g] | Density [g/cc] | for comparison Density [g/cc] |
| 1 | 13.03 | 7.64 | 7.58 |
| 2 | 13.36 | 7.65 | 7.62 |
| 3 | 13.28 | 7.7 | 7.6 |
| 4 | 12.81 | 7.7 | 7.6 |
| 5 | 13.12 | 766 | 7.63 |
| 6 | 13.3 | 7.67 | 7.57 |
| 7 | 12.94 | 7.67 | 7.58 |

Sure Stop™ Gripping Elements 8"-12": Dimensional Control Vs Cold Drawn Samples:

Comparing 23 inserts that were injected to 10 cold drawn gripping inserts from the production line, it is apparent that the dimensional control is better for injected inserts, as seen in the different measured ranges.

TABLE VII

| | Injected | | | | | | |
|---|---|---|---|---|---|---|---|
| MINIMUM | 14.38 | 9.54 | 13.49 | 5.72 | 11.68 | 3.91 | 15.75 |
| MAXIMUM | 14.54 | 9.70 | 13.65 | 5.88 | 11.84 | 4.07 | 15.91 |

| PART | | | | ITEM | | | |
|---|---|---|---|---|---|---|---|
| TAG No. | B | D | F | I | K | N | P |
| 1 | 14 | 9.21 | 13.44 | 5.81 | 11.58 | 3.97 | 15.88 |
| 2 | 14.04 | 9.29 | 13.49 | 5.81 | 11.59 | 3.9 | 15.91 |
| 3 | 14.02 | 9.27 | 13.5 | 5.83 | 11.61 | 4.02 | 15.9 |
| 4 | 14.04 | 9.31 | 13.51 | 5.8 | 11.58 | 4 | 15.89 |
| 5 | 14.05 | 9.23 | 13.47 | 5.78 | 11.63 | 3.97 | 15.9 |
| 6 | 14.09 | 9.31 | 13.53 | 5.79 | 11.55 | 3.95 | 15.92 |

TABLE VII-continued

| | | | Injected | | | | |
|---|---|---|---|---|---|---|---|
| 7 | 14.16 | 9.34 | 13.54 | 5.79 | 11.55 | 3.99 | 15.92 |
| 8 | 14.13 | 9.32 | 13.46 | 5.79 | 11.58 | 3.97 | 15.88 |
| 9 | 14.06 | 9.26 | 13.44 | 5.8 | 11.58 | 4 | 15.86 |
| 10 | 14.16 | 9.34 | 13.42 | 5.79 | 11.56 | 4 | 15.83 |
| 11 | 14.08 | 9.31 | 13.41 | 5.77 | 11.54 | 3.92 | 15.80 |
| 12 | 14.20 | 9.35 | 13.36 | 5.83 | 11.60 | 3.89 | 15.76 |
| 13 | 14.06 | 9.33 | 13.48 | 5.74 | 11.52 | 4.00 | 15.82 |
| 14 | 13.94 | 9.25 | 13.47 | 5.76 | 11.58 | 4.00 | 15.87 |
| 15 | 14.08 | 9.33 | 13.38 | 5.80 | 11.57 | 3.95 | 15.78 |
| 16 | 14.01 | 9.26 | 13.36 | 5.73 | 11.50 | 4.00 | 15.75 |
| 17 | 14.03 | 9.30 | 13.42 | 5.84 | 11.50 | 3.95 | 15.80 |
| 18 | 14.01 | 9.25 | 13.40 | 5.86 | 11.60 | 4.01 | 15.88 |
| 19 | 14.00 | 9.22 | 13.45 | 5.86 | 11.60 | 4.02 | 15.86 |
| 20 | 14.08 | 9.33 | 13.42 | 5.72 | 11.58 | 3.99 | 15.75 |
| 21 | 14.15 | 9.33 | 13.39 | 5.80 | 11.54 | 3.89 | 15.76 |
| 22 | 14.16 | 9.30 | 13.33 | 5.74 | 11.51 | 4.00 | 15.75 |
| 23 | 14.03 | 9.31 | 13.40 | 5.81 | 11.56 | 4.01 | 15.81 |
| AVG | 14.07 | 9.29 | 13.44 | 5.79 | 11.57 | 3.97 | 15.84 |
| STD DEV | 0.07 | 0.04 | 0.06 | 0.04 | 0.04 | 0.04 | 0.06 |
| RANGE | 0.26 | 0.14 | 0.21 | 0.14 | 0.13 | 0.13 | 0.17 |

TABLE VIII

| | | | Production Line | | | | |
|---|---|---|---|---|---|---|---|
| MINIMUM | 14.38 | 9.54 | 13.49 | 5.72 | 11.68 | 3.91 | 15.75 |
| MAXIMUM | 14.54 | 9.70 | 13.65 | 5.88 | 11.84 | 4.07 | 15.91 |

| PART | | | ITEM | | | | |
|---|---|---|---|---|---|---|---|
| TAG No. | B | D | F | I | K | N | P |
| 1 | 14.28 | 9.37 | 13.32 | 5.68 | 11.66 | 4.16 | 15.7 |
| 2 | 14.23 | 9.37 | 13.32 | 5.62 | 11.67 | 4.19 | 15.72 |
| 3 | 14.3 | 9.49 | 13.18 | 5.63 | 11.58 | 4.17 | 15.66 |
| 4 | 14.6 | 9.38 | 13.28 | 5.62 | 11.6 | 4.26 | 15.76 |
| 5 | 14.44 | 9.52 | 13.21 | 5.66 | 11.72 | 4.12 | 15.63 |
| 6 | 14.65 | 9.69 | 13.17 | 5.67 | 11.68 | 4.09 | 15.45 |
| 7 | 14.35 | 9.46 | 13.27 | 5.67 | 11.71 | 4.24 | 15.73 |
| 8 | 14.22 | 9.43 | 13.33 | 5.73 | 11.64 | 4.24 | 15.92 |
| 9 | 14.3 | 9.5 | 13.21 | 5.65 | 11.64 | 4.12 | 15.8 |
| 10 | 14.41 | 9.55 | 13.25 | 5.64 | 11.66 | 4.16 | 15.73 |
| AVG | 14.39 | 9.50 | 13.29 | 5.68 | 11.67 | 4.17 | 15.73 |
| STD DEV | 0.15 | 0.12 | 0.13 | 0.07 | 0.07 | 0.06 | 0.13 |
| RANGE | 0.43 | 0.33 | 0.48 | 0.26 | 0.26 | 0.35 | 0.47 |

TurnerLock™ DN 200 Gripping Inserts:

The density of the Turnerlok™ DN 200 gripping inserts were studied and the density values obtained correlated well with literature values as shown in Table IX below:

TABLE IX

| | 316 L TurnerLock™ Stainless | |
|---|---|---|
| Sample | Density cc/cm3 | Tundra ® reported value g/cc |
| 1 | 7.8 | 7.9 |
| 2 | 7.76 | |

Hardness of the TurnerLock™ was also studied and the results summarized in the Table X which follows:

TABLE X

| Hardness Turnerlock ™ | |
|---|---|
| Specimen | Value HRB |
| 1 | 74 |
| 2 | 70 |
| 3 | 68 |
| 4 | 66 |
| 5 | 68 |
| 6 | 70 |
| 7 | 70 |
| 8 | 68 |

Table XI below show the results of a sintered part dimensional inspection for the final gripping segments. The dimensions were measured after sintering, but before hardening. It is evident from the measurements taken that the critical dimensions are tightly controlled:

TABLE XI

SURE STOP SEGMENTS 8" TO 12"
Third Sample Prototype Mold-
Sintered Part Dimensional Inspection

| Part | 14.20 +<br>0.1 − 0.3 | 15.83 +/− 0.08 | 17.61 +/− 0.08 |
|---|---|---|---|
| 1 | 14.22 | 15.78 | 17.59 |
| 2 | 14.21 | 15.88 | 17.62 |
| 3 | 14.16 | 15.79 | 17.6 |
| 4 | 14.19 | 15.77 | 17.53 |
| 5 | 14.17 | 15.76 | 17.58 |
| 6 | 14.17 | 15.81 | 17.55 |
| 7 | 14.17 | 15.76 | 17.58 |
| 8 | 14.23 | 15.82 | 17.56 |
| 9 | 14.18 | 15.82 | 17.56 |
| 10 | 14.22 | 15.84 | 17.58 |
| 11 | 14.23 | 15.91 | 17.65 |
| 12 | 14.20 | 15.79 | 17.54 |
| 13 | 14.20 | 15.9 | 17.65 |
| 14 | 14.17 | 15.79 | 17.59 |
| 15 | 14.18 | 15.82 | 17.62 |
| 16 | 14.18 | 15.79 | 17.58 |
| 17 | 14.21 | 15.78 | 17.53 |
| 18 | 14.22 | 15.79 | 17.56 |
| 19 | 14.18 | 15.77 | 17.57 |
| 20 | 14.20 | 15.89 | 17.66 |
| AVG | 14.19 | 15.81 | 17.59 |
| STDEV | 0.022 | 0.047 | 0.039 |
| RANGE | 0.07 | 0.15 | 0.13 |

Figure 7A:
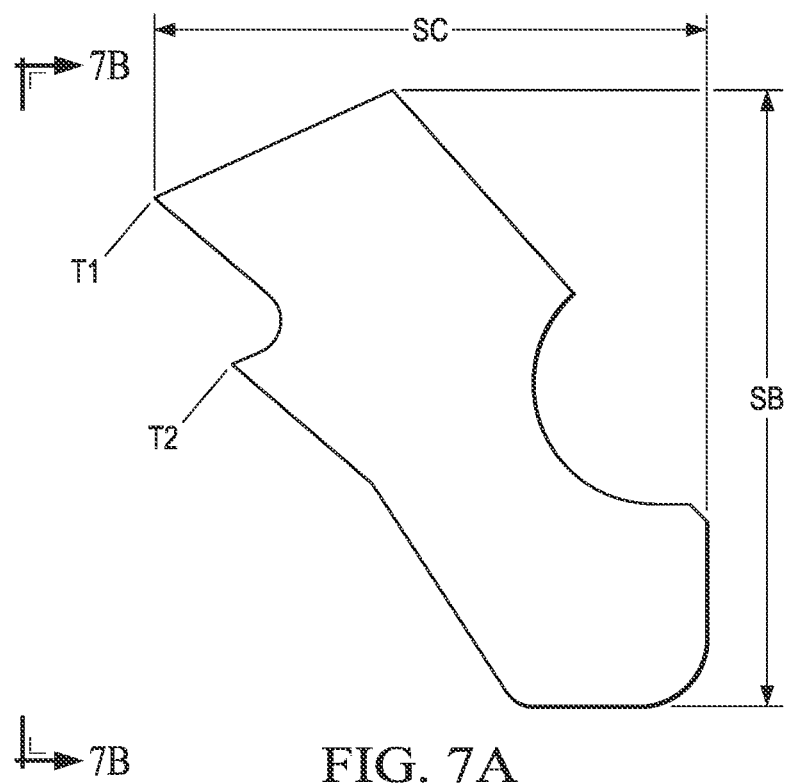
FIGS. 7A and 7B are views similar to FIG. 5 of the final prototype gripping elements showing the dimensions after sintering and hardening.
Figure 7B:
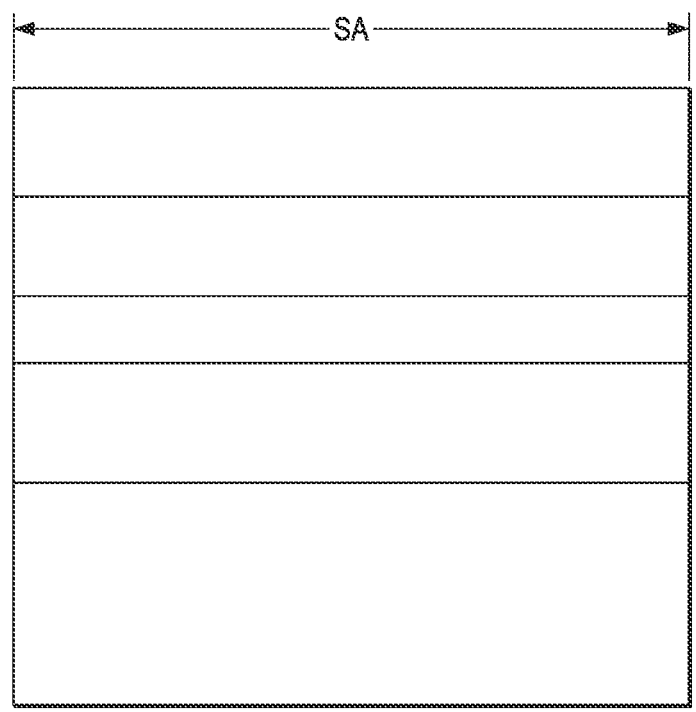

Table XII below show the measurements of dimensions, tooth sharpness and hardness of the final gripping segments after sintering and hardening, the dimensions being measured with reference to FIG. 7A of the drawings:

TABLE XII

DIMENSIONAL REPORT

| Specifications | SA | SB | SC | Ratio | Hardness |
|---|---|---|---|---|---|
| Nominal Minimum | 14.2-0.3 + | 17.61 ± | 15.83 ± | 0.13 | RC |
| Tolerance | 0.1 | 0.08 | 0.08 | 0.00 | 49 ± 4 |
| Maximum Tolerance | 13.90 | 17.53 | 15.75 | 0.13 | 45 |
| Sample # | 14.30 | 17.69 | 15.91 | T1 | T2 | 53 |
| 1 | 14.29 | 17.69 | 15.92 | 0.04 | 0.03 | 52 |
| 2 | 14.23 | 17.60 | 15.84 | 0.04 | 0.05 | 52 |
| 3 | 14.25 | 17.60 | 15.87 | 0.06 | 0.03 | 50 |
| 4 | 14.21 | 17.55 | 15.85 | 0.04 | 0.03 | 50 |
| 5 | 14.25 | 17.63 | 15.85 | 0.06 | 0.04 | 49 |
| 6 | 14.25 | 17.63 | 15.85 | 0.05 | 0.05 | 52 |
| 7 | 14.29 | 17.69 | 15.92 | 0.05 | 0.06 | 52 |
| 8 | 14.24 | 17.61 | 15.86 | 0.03 | 0.08 | 52 |
| 9 | 14.27 | 17.68 | 15.90 | 0.05 | 0.05 | 52 |
| 10 | 14.19 | 17.54 | 15.84 | 0.05 | 0.04 | 53 |
| Minimum | 14.19 | 17.54 | 15.84 | 0.03 | 0.03 | 49 |
| Maximum | 14.29 | 17.69 | 15.92 | 0.06 | 0.08 | 53 |
| Average | 14.25 | 17.62 | 15.87 | 0.05 | 0.05 | 51 |

Figure 8:
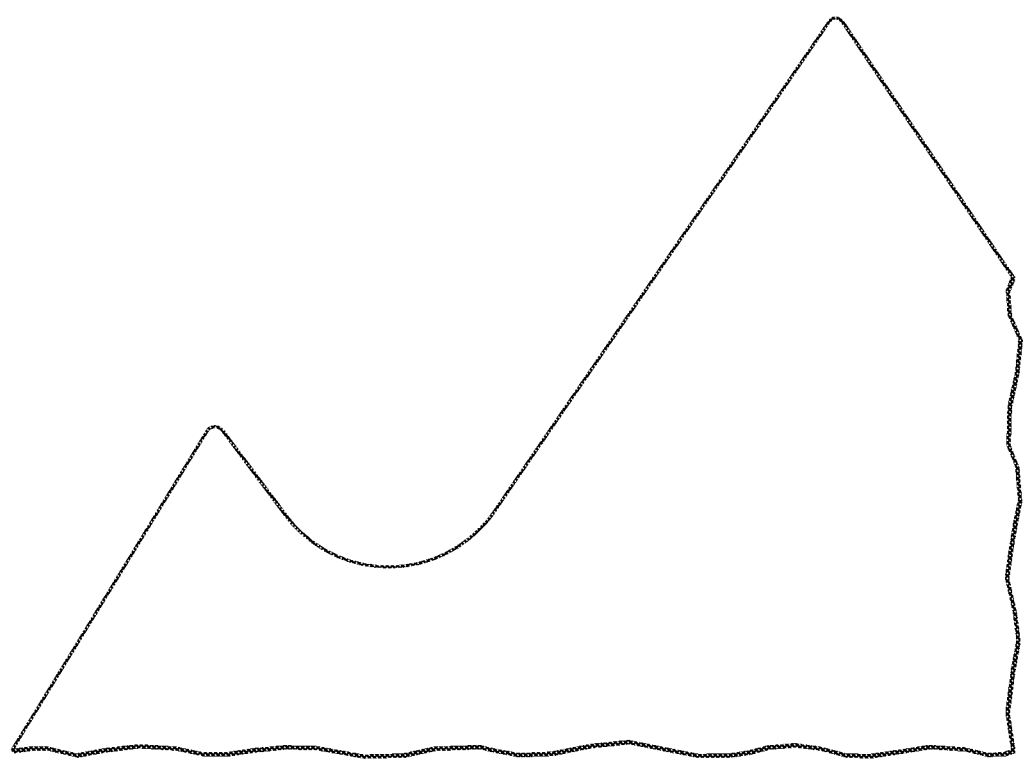
FIG. 8 is a copy of an actual tracing of the tooth of a prototype gripping segment, showing the relative sharpness of the tooth.

FIG. 8 of the drawings is a tracing of an actual segment showing the tooth sharpness which was achieved.

The final segments were then made into gaskets (12" Sure Stop Gaskets) and tested. The gaskets passed pressure tests and showed no failures after testing by a customer. The test results showed the gaskets passed 700 psi with no fractures, leaks or other problems. One gasket was tested to failure at 1300 psi which caused a separation of the two pipes, but no tooth breakage or failure.

CONCLUSION

An invention has been provided with several advantages. The techniques of the invention allow for the fabrication of high quality, durable, flexible, strong joint structures, with different types of inserts, for example heavy, dense hard grip rings or dense, hard, serrated joint inserts for pipeline joints. The gripping elements formed according to the principles of the invention are produced with a much higher weight, at much lower production costs, energy consumption requirements and wear on the production equipment than is possible with current state of the art.

The newly described techniques can be used to produce whole gaskets, both with large metallic ring inserts as well as with smaller serrated structures for internal joint systems in pipeline applications, as encountered in industries such as the waterworks industry or the oil and gas industry. The use of the described novel particle interaction modifiers allows the creation of heavier structures with better dimension control, density and structural properties' control than the current state of the art. The techniques of the invention can be utilized to produce hardened gripping elements with dimensional shrinkage on the order of only 10%, or typically less.

"Bulldog®" gripping rings made with the Tundra® materials show no deformation after cutting. The rings are completely stable. A Bulldog® gripping ring cut from a casting exhibits a good deal of residual stress. This residual stress causes large deformations on the order of 5-10 mm when cut. There is thus a significant advantage to be gained by not having to adjust the Bulldog® gripping rings previously made from castings after cutting.

What is claimed is:

1. A method for manufacturing a hardened gripping element for a sealing and restraint system used for forming a pipe joint in a water or sewer fluid pipeline of the type used in the waterworks industry, the method comprising the steps of:
   providing a starting material comprised of an interfacially modified particulate and polymer composite material, the starting material comprising a metal particulate phase and a polymer phase;
   forming a green metal composite article by either extruding the starting material or molding the starting material into a metal polymer composite article having at least one gripping surface having a plurality of gripping teeth;
   thermally debinding and sintering the green metal composite article to produce a finished or near finished hardened gripping element; and
   wherein the finished hardened gripping element is further characterized as having a linear shrinkage of less than 10%.

2. The method of claim 1, wherein the metal composite body is formed by an extrusion process.

3. The method of claim 1, wherein the metal composite body is formed by molding using either a compression molding or injection molding process.

4. The method of claim 1, wherein the particulate comprise particles of stainless steel and the polymer is comprised of a polyolefin polymer.

5. The method of claim 4, wherein the metal particulate phase makes up greater than 80% by weight of the particulate mix.

6. A method for manufacturing a hardened gripping element for a sealing and restraint system used for forming a pipe joint in a water or sewer fluid pipeline of the type used in the waterworks industry, the method comprising the steps of:

provoding a starting material comprised of an interfacially modified particulate and polymer composite material, the starting material comprising a metal particulate phase and a polymer phase;

creating a three dimensional printed metallic mold of the gripping element that is to be manufactured;

forming a green metal composite article by injection molding the starting material mix in an injection molding machine into the three dimensional metallic mold to thereby form a metal polymer composite article having at least one gripping surface having a plurality of gripping teeth;

in a single step, thermally debinding and sintering the green metal composite article to produce a near finished hardened gripping element;

finish machining the hardened gripping element to form a finished hardened gripping element; and wherein the finished hardened gripping element is further characterized as having a linear shrinkage of less than 10%.

7. The method of claim 6, wherein the particulate phase is made up of stainless steel particles.

8. The method of claim 6, wherein the polymer phase is a polyolefin polymer.

9. The method of claim 6, wherein the particulate phase makes up at least 80% by weight of the metal polymer composite mix.

10. The method of claim 6, wherein the finished hardened gripping element is further characterized as having a linear shrinkage of 8.6% or less.

11. A method forming a sealed and restrained pipe joint between two sections of plastic pipe in a water or sewer fluid pipeline of the type used in the waterworks industry, the method comprising the steps of:

providing a starting material comprised of an interfacially modified particulate and polymer composite material, the starting material comprising a metal particulate phase and a polymer phase;

creating a three dimensional printed metallic mold of the gripping element that is to be manufactured;

forming a green metal composite article by injection molding the starting material mix in an injection molding machine into the three dimensional metallic mold to thereby form a metal polymer composite article having at least one gripping surface having a plurality of gripping teeth;

thermally debinding and sintering the green metal composite article to produce a near finished hardened gripping element;

if necessary, finish machining the near finished gripping element to produce a finished element;

incorporating the finished metal composite article into a sealing and restraint system where the metal composite article is paired with a sealing gasket to thereby form a sealing and restraint system;

installing the sealing and restraint system into a mouth region of a section of belled plastic pipe;

installing a male pipe end into the mouth region of the section of belled plastic pipe to thereby form a sealed and restrained pipe joint; and wherein the finished hardened gripping element which is used in the sealing and restraint system is further characterized as having a linear shrinkage of less than 10%.

12. The method of claim 11, wherein the metal composite body is formed by an extrusion process.

13. The method of claim 11, wherein the metal composite body is formed by molding using either a compression molding or injection molding process.

14. The method of claim 11, wherein the particles are formed of stainless steel and the polymer phase is comprised of a polyolefin polymer.

15. The method of claim 11, wherein the metal particulate phase makes up at least 80% by weight of the particulate mix.

* * * * *